(12) United States Patent
Takagi et al.

(10) Patent No.: US 10,258,018 B2
(45) Date of Patent: Apr. 16, 2019

(54) ANIMAL TOILET

(71) Applicant: UNICHARM CORPORATION, Ehime (JP)

(72) Inventors: Chiyo Takagi, Kagawa (JP); Shinya Kaneko, Kagawa (JP)

(73) Assignee: Unicharm Corporation, Ehime (JP)

( * ) Notice: Subject to any disclaimer, the term of this patent is extended or adjusted under 35 U.S.C. 154(b) by 0 days.

(21) Appl. No.: 14/761,194

(22) PCT Filed: Mar. 11, 2015

(86) PCT No.: PCT/JP2015/057098
§ 371 (c)(1),
(2) Date: Jul. 15, 2015

(87) PCT Pub. No.: WO2016/139817
PCT Pub. Date: Sep. 9, 2016

(65) Prior Publication Data
US 2017/0367295 A1  Dec. 28, 2017

(30) Foreign Application Priority Data
Mar. 2, 2015 (JP) ................... 2015-040206

(51) Int. Cl.
*A01K 1/01* (2006.01)
*A01K 29/00* (2006.01)

(52) U.S. Cl.
CPC ............ *A01K 1/0107* (2013.01); *A01K 1/011* (2013.01); *A01K 1/0114* (2013.01)

(58) Field of Classification Search
CPC ..... A01K 1/0107; A01K 1/011; A01K 1/0114
(Continued)

(56) References Cited

U.S. PATENT DOCUMENTS 3,908,597 A * 9/1975 Taylor .................. A01K 1/0114
119/166
4,602,593 A * 7/1986 Gross .................... A01K 1/0114
119/166
(Continued)

FOREIGN PATENT DOCUMENTS

JP   2004-49030 A   2/2004
JP   2007-124 A   1/2007
(Continued)

OTHER PUBLICATIONS

International Search Report form PCT/ISA/237from corresponding PCT application No. PCT/JP2015/057098 dated May 19, 2015 (4 pgs).
(Continued)

*Primary Examiner* — David J Parsley
(74) *Attorney, Agent, or Firm* — Brinks Gilson & Lione

(57) ABSTRACT

An animal toilet includes: a front-rear direction, a right-left direction, and a height direction; an upper container that is to be placed with excrement treating material on a bottom portion having a plurality of holes through which urine passes, the bottom portion being a part positioned lowest inside the upper container, in a state where an absorbent body has been placed in a tray, a central position of the bottom portion of the upper container being arranged nearer to a rear side than a central position of the absorbent body, in the front-rear direction; the tray that is to be placed with the absorbent body that absorbs urine that has passed through the holes; and a lower container put below the upper container, the lower container storing the tray.

16 Claims, 10 Drawing Sheets

(58) Field of Classification Search
USPC .......................................... 119/165, 166, 169
See application file for complete search history.

(56) References Cited

U.S. PATENT DOCUMENTS

| | | | |
|---|---|---|---|
| 5,195,464 A | 3/1993 | Mutter | |
| 5,211,133 A * | 5/1993 | Foley | A01K 1/0114 119/165 |
| 5,598,810 A * | 2/1997 | Lawton, III | A01K 1/0114 119/166 |
| 6,205,953 B1 | 3/2001 | Ginn | |
| 6,401,660 B1 * | 6/2002 | Wolff | A01K 1/0114 119/165 |
| 6,408,790 B1 * | 6/2002 | Maguire | A01K 1/0114 119/165 |
| 7,380,519 B2 * | 6/2008 | Ikegami | A01K 1/0107 119/161 |
| 7,849,818 B2 * | 12/2010 | Matsuo | A01K 1/0107 119/165 |
| 8,640,649 B2 * | 2/2014 | Matsuo | A01K 1/0107 119/166 |
| 8,851,014 B2 * | 10/2014 | Hecht | A01K 1/0114 119/166 |
| 2009/0038554 A1 * | 2/2009 | Tsutsumi | A01K 1/0107 119/166 |

FOREIGN PATENT DOCUMENTS

| | | |
|---|---|---|
| JP | 2009-11181 A | 1/2009 |
| JP | 5768200 B | 6/2015 |

OTHER PUBLICATIONS

International Preliminary Report on Patentability and Written Opinion from corresponding PCT application No. PCT/JP2015/057098 dated Sep. 5, 2017 (8 pgs).
Japanese Office Action from corresponding Japanese application No. 2015093002 dated Oct. 30, 2018 (2 pgs).

* cited by examiner

ANIMAL TOILET

RELATED APPLICATION

The present application is a 35 U.S.C. § 371 national stage filing of International Patent Application No. PCT/JP2015/057098, filed Mar. 11, 2015, to which priority is claimed under 35 U.S.C. § 120 and through which priority is claimed under 35 U.S.C. § 119 to Japanese Priority Patent Application No. 2015-040206, filed Mar. 2, 2015.

TECHNICAL FIELD

The present invention relates to toilets for animals.

BACKGROUND

An animal toilet which is used by animals such as cats is conventionally known. For example, PTL 1 discloses an animal toilet including an upper part container having an opening through which the animal enters and exits and a liquid permeable bottom surface portion that passes through urine that has been excreted, a placing container for placing an absorbent sheet that absorbs urine that has passed through the bottom surface portion, and a lower portion container positioned below the bottom surface portion and that stores the placement container while supporting the upper part container.

CITATION LIST

Patent Literature

PTL 1: Japanese Laid-open Application Publication No. 2009-11181

SUMMARY

Technical Problem

During use of such an animal toilet, usually, particulate matters (excrement treating material) such as cat litter is disposed on the liquid-permeable bottom surface portion, and an animal such as a cat excretes on the particulate matters. But, since the particulate matters are in a state of being merely scattered on the bottom surface portion, due to such as the action of the animal mixing the particulate matters with legs after excreting, there are cases where the particulate matters that have become dirty with excretions spill outside of the animal toilet. In particular, the front part of the upper part container is provided with an opening portion (entrance/exit) through which the animal enters and exits, thus in the case where the particulate matters are disposed near the front part of the upper part container, the particulate matters become easy to leak outside from the entrance/exit. Therefore, in order to suppress the particulate matters such as cat litter from leaking outside, it is preferable that the particulate matters are disposed to the rear side of the animal toilet.

This invention has been made in view of the above circumstances, and an objective thereof is to provide an animal toilet in which particulate matters can be easily disposed to the rear side in a front-rear direction.

Solution to Problem

A main aspect of the invention for achieving the above objective is an animal toilet including:

a front-rear direction, a right-left direction, and a height direction;

an upper container that is to be placed with excrement treating material on a bottom portion having a plurality of holes through which urine passes, the bottom portion being a part positioned lowest inside the upper container, in a state where an absorbent body has been placed in a tray, a central position of the bottom portion of the upper container being arranged nearer to a rear side than a central position of the absorbent body, in the front-rear direction;

the tray that is to be placed with the absorbent body that absorbs urine that has passed through the holes; and a lower container put below the upper container, the lower container storing the tray.

Other features of the present invention will be made clear through the present specification with reference to the accompanying drawings.

Advantageous Effects of Invention

According to the present invention, an animal toilet can be provided in which particulate matters can be easily disposed to the rear side in the front-rear direction.

DESCRIPTION OF EMBODIMENTS

Figure 1:
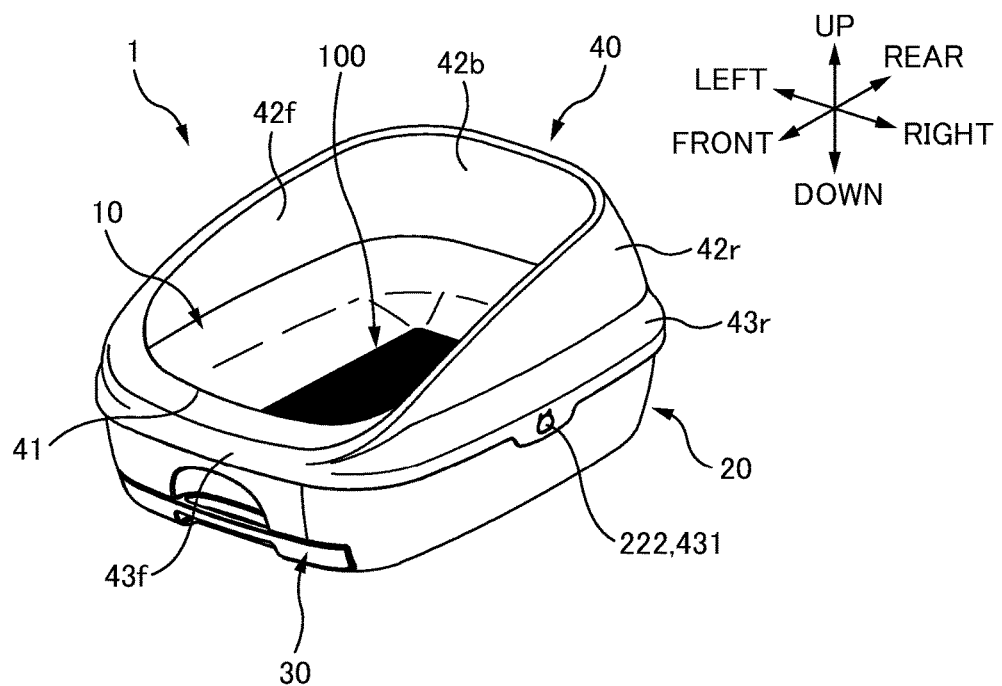
FIG. 1 is a schematic perspective view of an animal toilet 1.

At least the following matters will become clear through the description of the present specification and the accompanying drawings.

An animal toilet including:

a front-rear direction, a right-left direction, and a height direction;

an upper container that is to be placed with excrement treating material on a bottom portion having a plurality of holes through which urine passes, the bottom portion being a part positioned lowest inside the upper container, in a state where an absorbent body has been placed in a tray, a central position of the bottom portion of the upper container being arranged nearer to a rear side than a central position of the absorbent body, in the front-rear direction;

the tray that is to be placed with the absorbent body that absorbs urine that has passed through the holes; and a lower container put below the upper container, the lower container storing the tray.

According to such an animal toilet, the position of the bottom portion which is the lowest part of the upper container will be nearer to the rear side in the front-rear direction than the position of the absorbent body, thus in the case where cat litter (excrement treating material) and the like is placed in the upper container, the excrement treating material will easily collect to the rear side of the animal toilet. Thus, spilling of the excrement treating material to outside of the toilet from the opening of the entrance/exit provided to the front of the animal toilet can be easily suppressed.

With the animal toilet, it is preferable that wherein at the time of putting the upper container on the lower container in the height direction, a restraining mechanism that restrains the upper container from being put on the lower container in a reverse direction in the front-rear direction is included.

According to such an animal toilet, by putting the upper container on the lower container in a reverse direction in the front-rear direction, the position of the bottom portion of the upper container can be suppressed from being near to the front in the front-rear direction. Thus, the excrement treating material can be suppressed from being placed to the front side of the animal toilet, and the excrement treating material will not easily spill outside.

With the animal toilet, it is preferable that wherein the restraining mechanism has claw portions provided to both sides in the right-left direction of the upper container, and protruding portions provided to edge portions on both sides in the right-left direction of the lower container, and in the case where the lower container and the upper container are put on each other so that a front side of the lower container and a rear side of the upper container are aligned, the claw portions and the protruding portions interfere with each other.

According to such an animal toilet, in the case where the assembling direction (placing direction) of the upper container to the lower container is in a reverse direction in the front-rear direction, by the claw portions and the protruding portions interfering with each other, a user can recognize the mistake of the placing direction. Thus, the upper container can be suppressed from being put on the lower container in a reverse direction in the front-rear direction, and the bottom portion of the upper container can be correctly arranged to the rear side of the animal toilet.

With the animal toilet, it is preferable that wherein the restraining mechanism has a to-be-engaged portion provided to one of a front side edge portion and a rear side edge portion of the upper container, and an engaging portion provided to an edge portion on a same side as where the to-be-engaged portion is provided of one of the front side edge portion and the rear side edge portion of the lower container, and in the case where the upper container is put on the lower container so that a front side of the lower container and a rear side of the upper container are aligned, one of interference of the engaging portion with an edge portion of the upper container and interference of the to-be-engaged portion with an edge portion of the lower container occurs .

According to such an animal toilet, in the case where the assembling direction (placing direction) of the upper container to the lower container is in a reverse direction in the front-rear direction, by the engaging portions of the lower container and the edge portions of the upper container interfering and the like, the user can easily recognize the mistake of the placing direction. Thus, the upper container can be suppressed from being put on the lower container in a reverse direction in the front-rear direction, and the bottom portion of the upper container can be correctly arranged to the rear side of the animal toilet.

With the animal toilet, it is preferable that wherein a cover that is arranged above the upper container is included, hole portions that penetrate through in the right-left direction are provided in edge portions of both sides of the cover in the right-left direction, side protruding portions protruding outward in the right-left direction are provided in edge portions of both sides of the lower container in the right-left direction, and in the case where the cover is arranged so that a front side of the lower container and a rear side of the cover are aligned, the hole portions and the side protruding portions do not fit.

According to such an animal toilet, in the case where the assembling direction of the cover to the lower container (upper container) is in a reverse direction in the front-rear direction, the hole portions and the side protruding portions do not fit, and thus the user can easily recognize the mistake of the assembling direction of the cover. Thus, the opening portion that is an entrance/exit of the toilet can be suppressed from being faced to the rear side in the front-rear direction.

With the animal toilet, it is preferable that wherein the lower container can store the tray by changing a direction of the tray in the front-rear direction.

According to such an animal toilet, the user can change the placing direction of the absorbent body in the front and the rear direction, without touching the absorbent body that is placed in the tray, and by using the absorbent body that has been changed in the front and the rear direction, the animal toilet can be used efficiently and hygienically.

With the animal toilet, it is preferable that wherein a step portion that is a part formed with a level difference in the height direction is provided in between an edge portion to a front side and the bottom portion of the upper container.

According to such an animal toilet, a conical part is formed to the lower side in the height direction of the step portion inside the upper container. By placing cat litter (excrement treating material) and the like in the above conical part, the excrement treating material is restrained from moving to the front side, and the excrement treating material can be restrained from spilling outside the animal toilet.

With the animal toilet, it is preferable that wherein the step portion has a front step portion and a rear step portion positioned nearer to a rear side in the front-rear direction than the front step portion, the rear step portion having a greater inclination than the front step portion.

According to such an animal toilet, at the time the animal excretes in the animal toilet, the front step portion formed in a substantially horizontal plane shape functions as a leg rest platform to place the forelegs of the animal. Thus, the animal can easily excrete facing the front side of the animal toilet, and excretion to the rear side of the upper container can be facilitated.

Embodiment Mode
<Overall Configuration>

Figure 2:
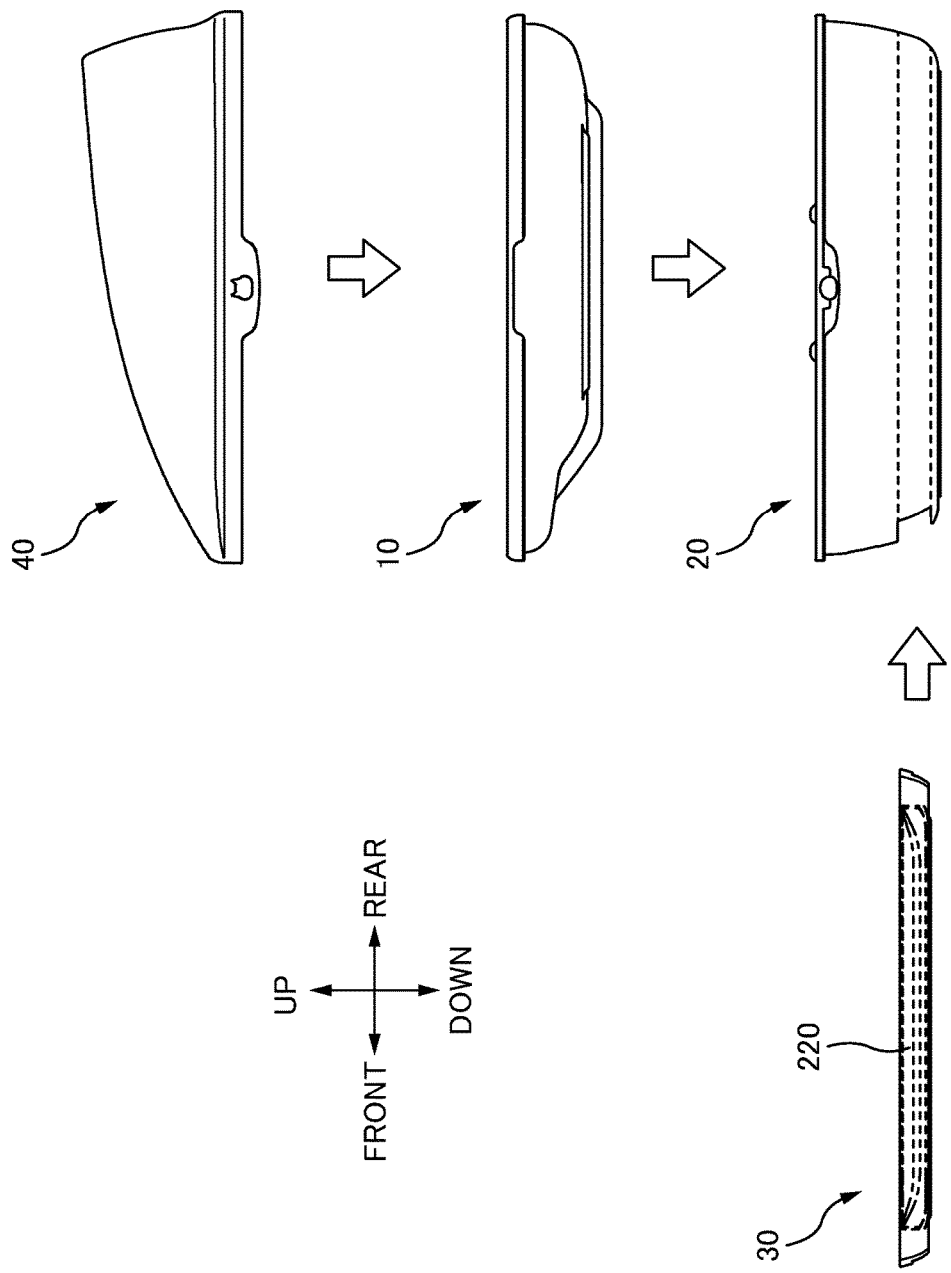
FIG. 2 is a schematic exploded side view of the animal toilet 1.

An animal toilet 1 will be described as an example of an animal toilet of this embodiment mode. FIG. 1 is a schematic perspective view of the animal toilet 1. FIG. 2 is a schematic exploded side view of the animal toilet 1. Further, in the following description, as shown in FIG. 1, the three directions of a "front-rear direction", a "right-left direction" and a "height direction" which intersect each other are defined. The front-rear direction is a direction along a longitudinal direction of the animal toilet 1, and a side provided with the entrance/exit of the animal is referred to as a front side. The right-left direction is a direction along a width direction of the animal toilet 1. The height direction is a direction along a vertical direction.

The animal toilet 1 includes an upper container 10, a lower container 20, a tray 30, and a cover 40, and with these four members the animal toilet 1 in a state to be used as shown in FIG. 1 is formed. The four members can be disassembled from or assembled with each other as shown in FIG. 2. Specifically, the lower container 20 can be assembled to be put below the upper container 10. The lower container 20 contains the tray 30 in which an absorbent body (an absorbent body 220 to be described later) that absorbs such as excreted urine can be placed. Then, the cover 40 is assembled to above the upper container 10. Each of the members can be disassembled from each other in this way, thus the cleaning work and the like becomes easy.

It should be noted that, each of the upper container 10, the lower container 20, the tray 30, and the cover 40 are formed with polyolefin base thermoplastic resin such as polyethylene, polypropylene, polyethylene terephthalate and the like. However, the material for forming each member is not limited to such. For example, resin other than the above may do or metal plates such as stainless steel plates, aluminum plates and the like may do.

Figure 3:
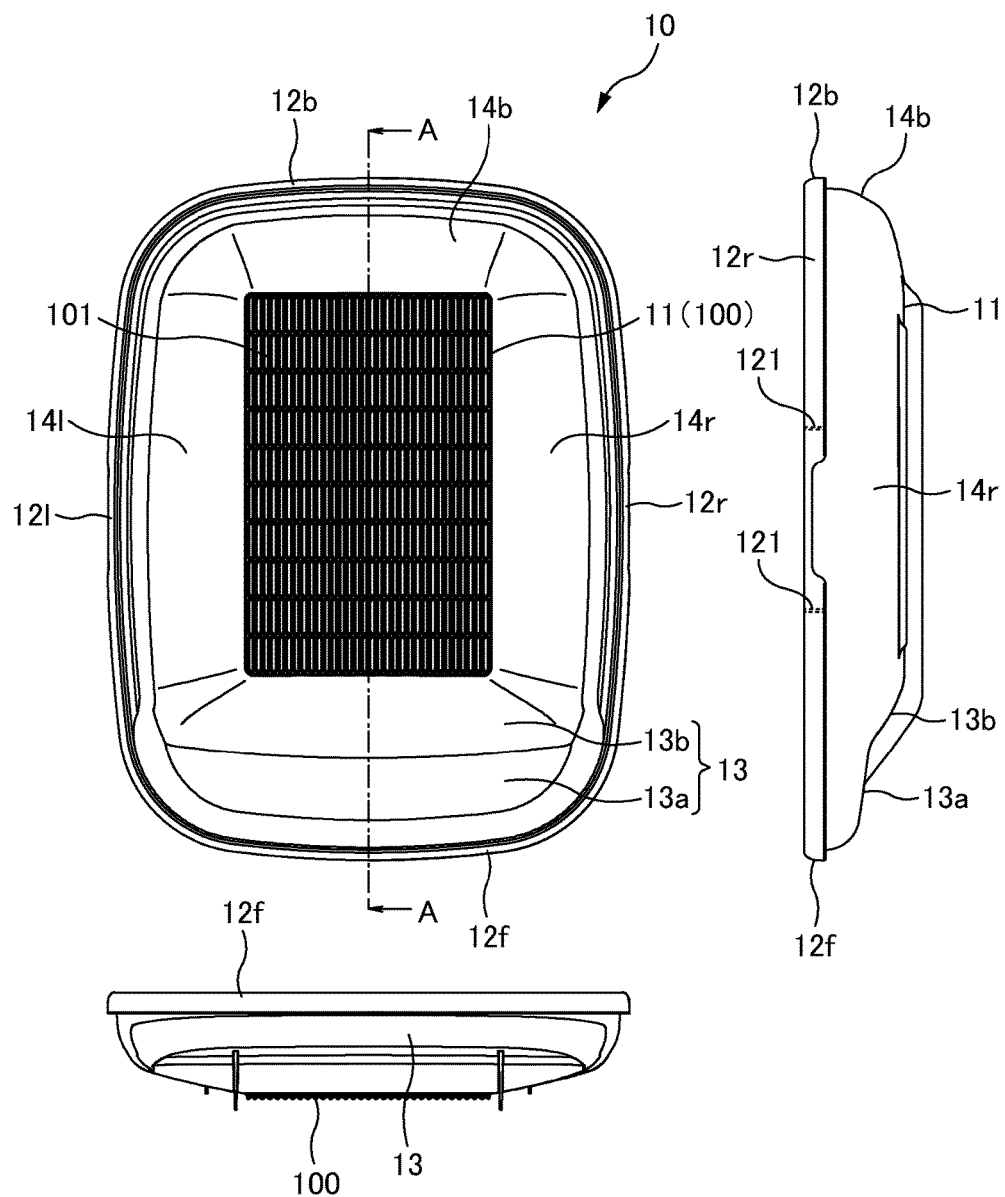
FIG. 3 is a view from three planes of an upper container 10.
Figure 4:
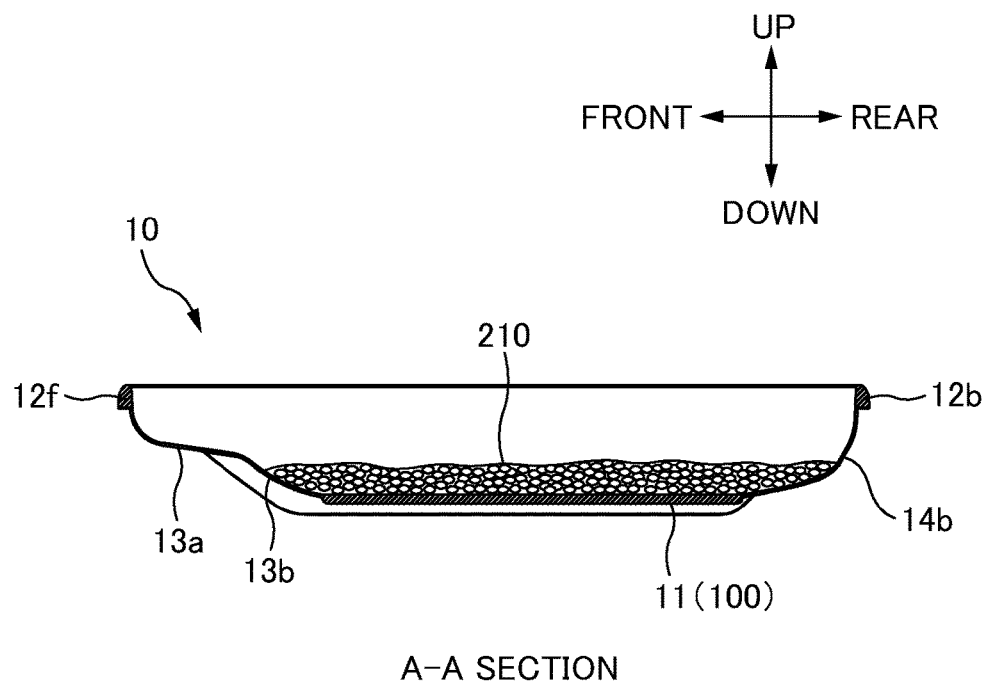
FIG. 4 is a view explaining an A-A section in FIG. 3.

FIG. 3 is a three-plane view of the upper container 10. FIG. 4 is a view explaining an A-A section in FIG. 3. The upper container 10 is a substantially box-shaped member with the above open, and an animal such as a cat excretes on an upper surface side of the upper container 10 (in other words corresponds to an inner side of the box). The upper container 10 has a bottom portion 11, an edge portion 12, a step portion 13, and an inclined portion 14.

The bottom portion 11 is a part that configures a bottom surface of the upper container 10, and is positioned lowest in the height direction of the upper container 10 (refer to FIG. 4). The bottom portion 11 is provided with a urine passing portion 100 that passes through urine and the like that has been excreted by the animal from the upper side to the lower side in the height direction. The urine passing portion 100 has a plurality of holes 101 that penetrate through in the height direction, and the urine that has been excreted passes through the holes 101 and move from the upper side to the lower side of the upper container 10.

During use of the animal toilet 1, particulate matters such as cat litter are placed on the upper surface of the urine passing portion 100, and the animal such as a cat excretes on the above particulate matters. In this embodiment mode, excrement treating material 210 is placed as shown in FIG. 4 as the particulate matters. The excrement treating material 210 is particulate matters having a porous structure, for example, such as zeolite, or silica gel, and by the excrement treating material 210 coming in contact with such as urine that has been excreted by the animal, the excrement treating material 210 has an effect of absorbing the ammonium component and deodorizing, and an effect of removing humidity. Further, by placing the particulate excrement treating material 210 in the urine passing portion 100, the animal can easily recognize the above part (the urine passing portion 100) as the place to excrete. To suppress each particulate of the excrement treating material 210 from dropping below through the holes 101 of the urine passing portion 100 (the bottom portion 11), the holes 101 are preferably of a shape and size that passes through urine but that does not pass through the excrement treating material 210. In this embodiment mode, the holes 101 are long slits to the front-rear direction as shown in FIG. 3. Hereafter, the holes 101 are also referred to as slits 101.

The edge portion 12 is a part that configures an outer edge in the front-rear direction and the left-right direction of the upper container 10, and the edge portion 12 has a front side edge portion 12f, a rear side edge portion 12b, a right side edge portion 12r, and a left side edge portion 12l. This edge portion 12 has a shape that is folded back to the outside in an upper end portion of the upper container 10, and can be overlapped in the height direction with the edge portion 22 of the lower container 20 to be described later. Further, each of a pair of claw portions 121 that extends in the height direction as shown by broken lines in FIG. 3 is provided in the inner sides that have been folded back of the right side edge portion 12r and the left side edge portion 12l.

The step portion 13 is a part formed with a level difference between the front side edge portion 12f and the bottom portion 11, and has a front step portion 13a that is a region to the front side in the front-rear direction and a rear step portion 13b that is a region to the rear side in the front-rear direction. The front step portion 13a and the rear step portion 13b have different inclination angles, and the front step portion 13a has a smaller inclination angle than the rear step portion 13b in the animal toilet 1. For this reason, a step is formed as shown in FIG. 4 between the front step portion 13a and the rear step portion 13b.

The inclined portion 14 has a rear side inclined portion 14b, a right side inclined portion 14r, and a left side inclined portion 14l. The rear side inclined portion 14b is a part that connects the rear side edge portion 12b and the bottom portion 11, and the right side inclined portion 14r is a part that connects the right side edge portion 12r and the bottom portion 11, and the left side inclined portion 14l is a part that connects the left side edge portion 12l and the bottom portion 11. Each portion forms a part each inclined between the edge portion 12 and the bottom portion 11, and thus the upper container 10 is formed into a substantially box-shape as shown in FIG. 3 and FIG. 4.

Figure 5:
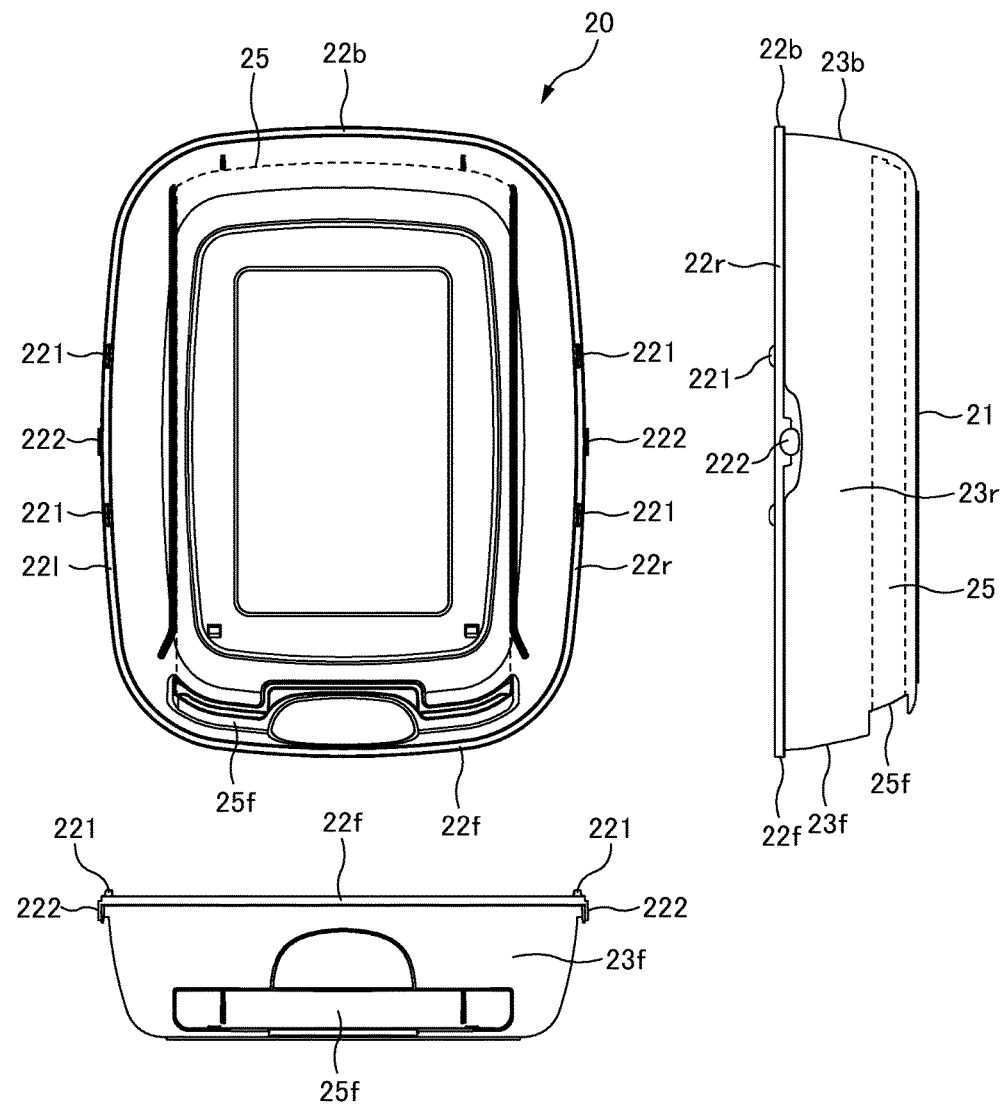
FIG. 5 is a view from three planes of a lower container 20.

FIG. 5 is a three-plane view of the lower container 20. The lower container 20 is a substantially box-shaped member that is open above, and is put below and assembled to the upper container 10 as shown in FIG. 1 and FIG. 2 during use of the animal toilet 1. The lower container 20 has a bottom portion 21, the edge portions 22, side wall portions 23, and a tray storing portion 25. The bottom portion 21 is a part configuring a bottom surface of the lower container 20. The edge portions 22 are parts configuring the outer edge in the front-rear direction and the right-left direction in the upper portion of the lower container 20, and the edge portions 22 include the front side edge portion 22f, the rear side edge portion 22b, the right side edge portion 22r, and the left side edge portion 22l. At the time of assembling the lower container 20 to the upper container 10, the edge portion 12 of the upper container 10 is put on the edge portion 22 of the lower container 20. Further, each of a pair of protruding portions 221 that protrude upwards is provided to an upper end surface of the right side edge portion 22r and the left side edge portion 22*l*, and side protruding portions 222 that protrude to the outside in the right-left direction are each provided to the side surfaces of the right side edge portion 22*r* and the left side edge portion 22*l*. The side wall portions 23 are wall members that are provided to stand upwards from the end edge portions of the bottom portion 21, and the side wall portions 23 include a front side wall portion 23*f*, a rear side wall portion 23*b*, a right side wall portion 23*r*, and a left side wall portion 23*l*.

The tray storing portion 25 is a part that stores the tray 30. As shown in FIG. 5, an opening portion 25*f* is provided below the front side edge portion 22*f*, and by slidingly moving the tray 30 from the opening portion 25*f* along the tray storing portion 25 shown by broken lines in FIG. 5 to the rear-side in the front-rear direction, the tray 30 can be stored inside the lower container 20.

Figure 6:
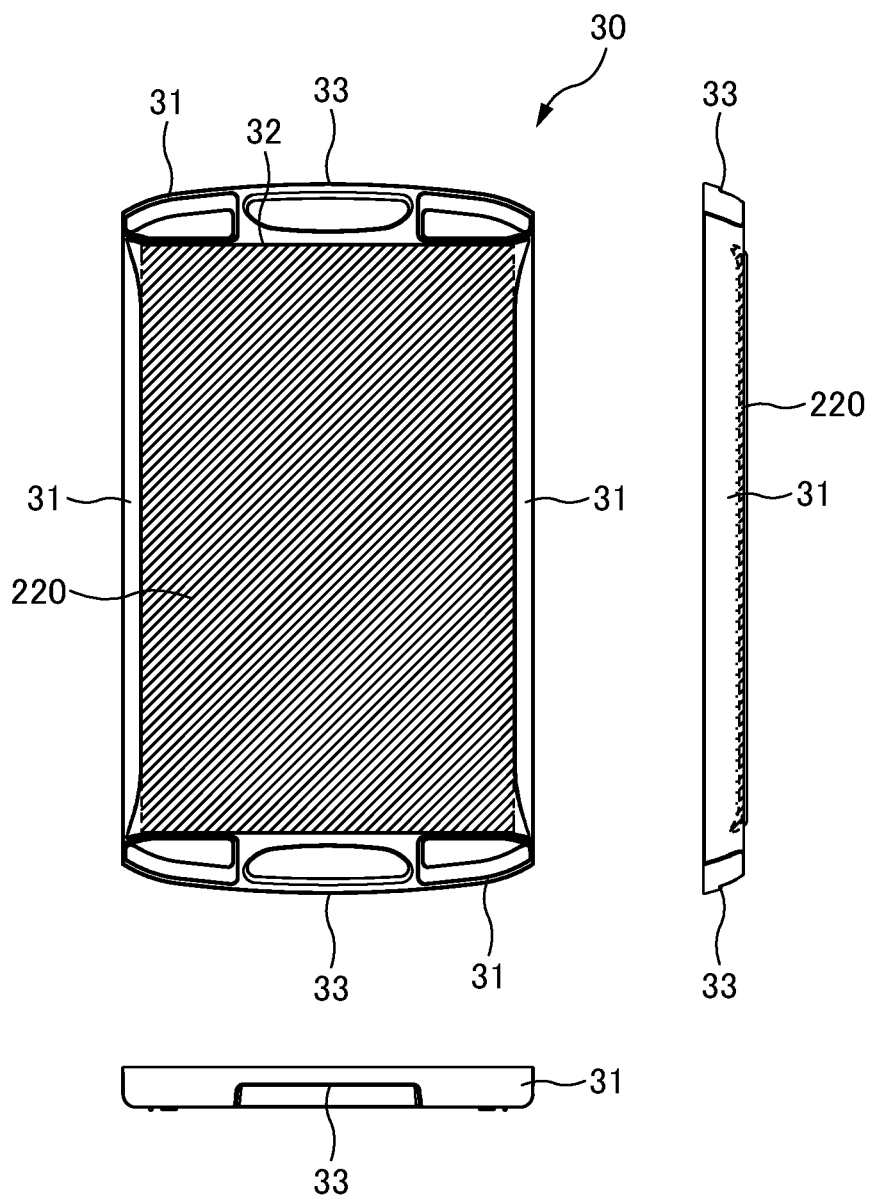
FIG. 6 is a view from three planes of a tray 30.

FIG. 6 is a three-plane view of the tray 30. The tray 30 is a flat box-shaped container having a shallow bottom in which an absorbent body that absorbs urine and the like is placed. The tray 30 has side wall portions 31, an absorbent body placing portion 32, and grip portions 33. The side wall portions 31 are wall surfaces surrounding the periphery of the tray 30, and the tray 30 in this embodiment mode is formed in a rectangular shape symmetrical in the front-rear direction. Then, the region to the inner side surrounded by the side wall portions 31 is formed with the absorbent body placing portion 32 for placing the absorbent body.

FIG. 6 shows a state where the absorbent body 220 (shown by hatched portion in the drawing) is placed in the absorbent body placing portion 32. The absorbent body 220 is a liquid absorbent sheet member that absorbs urine excreted by an animal such as a cat, and is formed with liquid absorbent material such as pulp fiber and superabsorbent polymer. Further, the absorbent body 220 may include deodorant microcapsules and antimicrobial agent, so as to encapsulate the odor of urine that has been absorbed and not reproduce unwanted bacteria. It should be noted that, the absorbent body 220 is shown as a rectangular sheet member in FIG. 6, but the shape of the absorbent body 220 is not limited as long as it can be held in the absorbent body placing portion 32.

The grip portions 33 are parts formed in both end portions in the front-rear direction of the tray 30, and at the time of storing the tray 30 in the lower container 20 or drawing out the tray 30 from the lower container 20, the grip portions 33 are gripped and operated so as to slidingly move the tray 30 in the front-rear direction. It should be noted that, as described above, the tray 30 in this embodiment mode is a symmetrical shape in the front-rear direction, thus the tray can be changed in the front-rear direction and housed in the lower container 20.

The cover 40 has an entrance/exit opening portion 41, the side wall portions 42, and edge portions 43, and the cover is placed above the upper container 10 and the lower container 20 (refer to FIG. 1). The entrance/exit opening portion 41 is a part that widely opens in the front side in the front-rear direction, and an animal can enter/exit the animal toilet 1 from this entrance/exit opening portion 41. In other words, the entrance/exit opening portion 41 corresponds to the entrance/exit of the animal toilet 1. The side wall portions 42 are formed in the periphery of the entrance/exit opening portion 41, and the side wall portions include a left side wall portion 42*f* and a right side wall portion 42*r* covering both sides in the right and left direction of the cover 40, and a rear side wall portion 42*b* covering the rear side in the front-rear direction of the cover 40. By providing the side wall portions 42, the particulate absorbent body 220 and the excrements can be suppressed from spilling or scattering to the outside of the animal toilet 1 (the upper container 10).

Further, in this embodiment mode, as shown in FIG. 1 and FIG. 2, the height of the left side wall portion 42*f* and the right side wall portion 42*r* are formed to become lower the nearer the wall portions are to the front side. In this way, the scattering of the absorbent body 220 can be suppressed in the rear side, and the view of the animal can be widely ensured in the front side so as to be able to see the outside from inside the toilet. By securing a sufficient view even when excreting, the animal can use the animal toilet 1 at ease. The edge portions 43 are parts configuring an outer edge below the cover 40, and the edge portions include a front side edge portion 43*f*, a rear side edge portion 43*b*, left side edge portion 43*l*, and a right side edge portion 43*r*. When the edge portion 43 engages with the edge portions 22 of the lower container 20, the cover 40 can be assembled to and fixed to the animal toilet 1. Further, in the vicinity of a central portion in the front-rear direction of the left side edge portion 43*l* and the right side edge portion 43*r* are provided fitting hole portions 431 that are hole portions penetrating through in the right-left direction.

At the time an animal such as a cat is excreting, the animal enters into the animal toilet 1 from the entrance/exit opening portion 41, and excretes such as urine in the part of the urine passing portion 100 that has been placed with the particulate excrement treating material 210 on the upper surface of the upper container 10. The excreted urine comes in contact with the excrement treating material 210 and passes through the plurality of the slits 101 of the urine passing portion 100 and drops to below. Then, the urine is absorbed with the absorbent body 220 placed below the urine passing portion 100, and stored in the tray 30. By the user replacing the absorbent body 220 that absorbs urine regularly, the user can use the animal toilet 1 hygienically.

<Arrangement of Urine Passing Portion 100>

In general, at the time of using the animal toilet, particulate matters (correspond to the excrement treating material 210 in this embodiment mode) such as cat litter is placed on the upper surface side of the upper container. The particulate matters are in a state scattered on the upper surface of the upper container and are not fixed, thus there is a possibility of the particulate matters spilling outside the animal toilet from the entrance/exit portion that is open to the front side of the animal toilet. In particular, the possibility of spilling increases, at the time the animal mixes the particulate matter after excreting with its legs, or during the animal entering/exiting the animal toilet. In order to suppress the above spilling, the particulate matters are preferably arranged as near to the rear side as possible of the upper container.

Further, with the animal toilet that absorbs and holds excreted urine with such as an absorbent sheet placed below the upper container, there is a case where the placing position of the absorbent sheet is displaced while the animal toilet is being used. For example, with the animal toilet 1 in this embodiment mode, due to the influence of inertia at the time of drawing out the tray 30 to the front side from the lower container 20, and adversely due to the impact at the time of storing the tray 30 in the lower container 20, there is a case where the absorbent body 220 is gradually displaced to the rear side of the tray 30. In the case where the animal excretes urine and the like to the front side in a state where the absorbent body 220 is displaced to the rear side, the absorbent body 220 cannot absorb the urine, and it may become difficult to maintain a hygienic state. Thus, in order to make the animal excrete as near to the rear side of the animal toilet 1 as possible, the excrement treating material 210 is preferably placed near to the rear side of the upper container 10.

On the contrary, in this embodiment mode, by arranging the region of the bottom portion 11 having the urine passing portion 100 near to the rear of the upper container 10, the excrement treating material 210 is suppressed from spilling outside.

Figure 7:
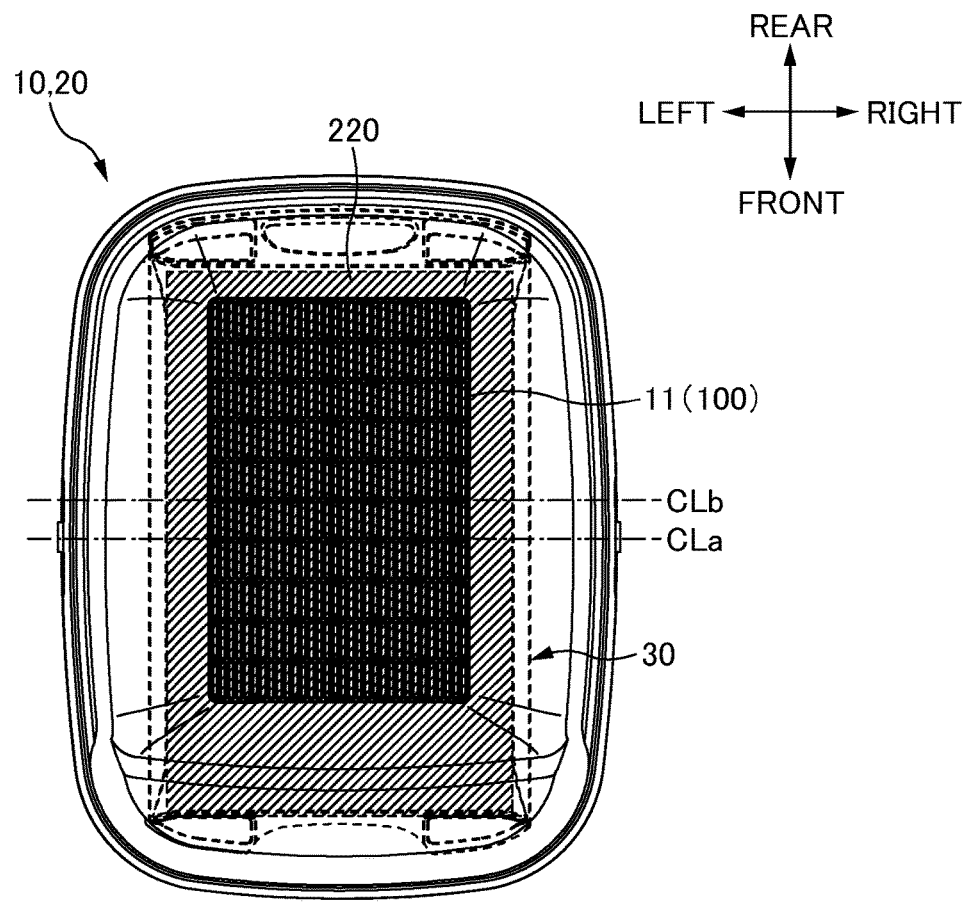
FIG. 7 is a plan view explaining an arrangement of a urine passing portion 100.

FIG. 7 is a plan view explaining arrangement of the urine passing portion 100. In FIG. 7, there is shown a state where the upper container 10 is put on the lower container 20 that stores the tray 30 placed with the absorbent body 220. It should be noted that, the positions of the tray 30 and the absorbent body 220 are shown by broken lines. Further, in FIG. 7, a central position in the front-rear direction of the absorbent body 220 is shown by CLa, and a central position in the front-rear direction of the urine passing portion 100 formed in the bottom portion 11 is shown by CLb.

The central position CLa of the absorbent body 220 is positioned in substantially the center in the front-rear direction of the animal toilet 1, whereas the central position CLb of the urine passing portion 100 is positioned near to the rear side than the center in the front-rear direction of the animal toilet 1. In other words, with the animal toilet 1 in this embodiment mode, with the absorbent body 220 in a placed state, in the front-rear direction, the central position of the urine passing portion 100 of the upper container 10 is arranged near to the rear side than the central position of the absorbent body 220. This urine passing portion 100 is formed in the bottom portion 11 which is at the lowest inside the upper container 10 (the upper surface side) as shown in FIG. 4. Thus, in the case where the particulate excrement treating material 210 is to be arranged in the upper container 10, the excrement treating material 210 naturally tends to remain in the bottom portion 11 which is the lowest position. Thus, in the case where the urine passing portion 100 (the bottom portion 11) is arranged near to the rear in the front-rear direction, the excrement treating material 210 is to be placed near to the rear in the front-rear direction.

Further, since the step portion 13 is provided to the front in the front-rear direction of the upper container 10, the animal toilet 1 is configured so that the excrement treating material 210 easily stays near to the rear side. As shown in FIG. 4, the front step portion 13*a* has a small inclination and is a flat surface near a horizontal state. On the other hand, the rear step portion 13*b* has a steeper inclination than the front step portion 13*a*. Thus, the inside (the upper surface side) of the upper container 10 is formed in a substantially conical shape with the rear step portion 13*b* and the inclined portion 14 (the rear side inclined portion 14*b*, the right side inclined portion 14*r*, the left side inclined portion 14*l*) and with the urine passing portion 100 as the bottom surface. As shown in FIG. 4, in the case where the particulate excrement treating material 210 is placed on the upper surface side of the urine passing portion 100, the excrement treating material 210 remains in the conical shaped part and are restricted movement in the direction to the front step portion 13*a*, thus the excrement treating material 210 is easily held to the rear side of the upper container 10.

Further, since the front step portion 13*a* is formed in a substantially horizontal flat shape, at the time the animal excretes inside the animal toilet 1, the front step portion 13*a* functions as a leg rest platform for the animal to place its forelegs. In this way, the animal can easily excrete while facing toward the front side and putting its forelegs on the front step portion 13*a*, and excretion of urine and the like to the rear side of the upper container 10 can be facilitated.

In this way, by providing the urine passing portion 100 to the rear side in the front-rear direction, the particulate excrement treating material 210 can also be easily placed to the rear side of the upper container 10. Thus, even when the animal mixes the excrement treating material 210 with its legs during excreting, the excrement treating material 210 can be suppressed from spilling outside of the animal toilet 1 from the front entrance/exit opening portion 41 (entrance/exit). Further, the surrounding of the rear side of the animal toilet 1 is covered high with the cover 40 (the side wall portions 42). Specifically, the height of the left side wall portion 42*f* and the right side wall portion 42*r* of the cover 40 are higher in the rear side than the front side, and the height of the rear side wall portion 42*b* of the cover 40 is also made high. Thus, in the region to the rear side of the animal toilet 1, the excrement treating material 210 does not easily spill outside.

By the way, for the front-rear direction central position CLb of the bottom portion 11 (the urine passing portion 100) of the upper container 10 to be arranged near to the rear side than the front-rear direction central position CLa of the absorbent body 220 (refer to FIG. 7), it is necessary to put (assemble) the upper container 10 on the lower container 20 without mistaking the front-rear direction. Supposing that the upper container 10 is put on the lower container 20 in a reverse direction in the front-rear direction, the position of the bottom portion 11 of the upper container 10 becomes closer to the front in the front-rear direction, and the excrement treating material 210 easily spills outside in the front side of the animal toilet 1.

Figure 8A:
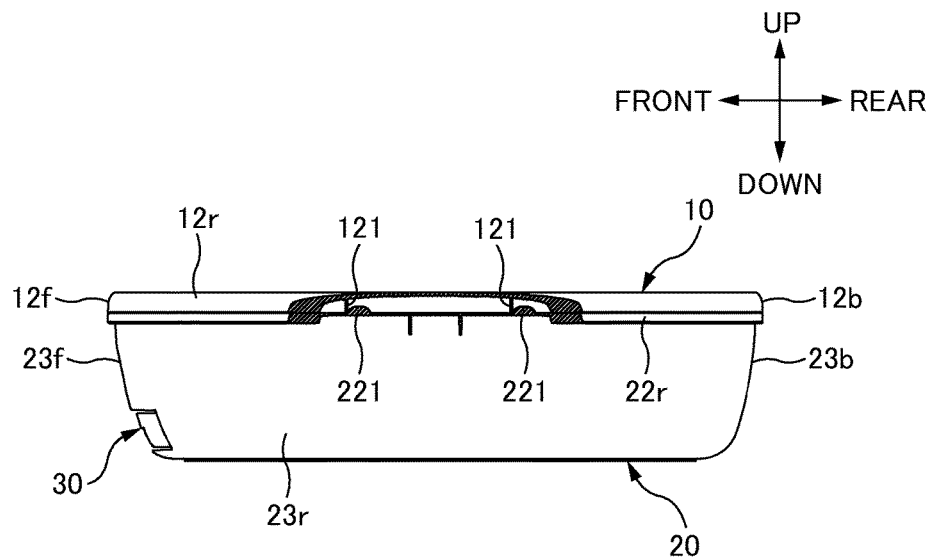
FIG. 8A is a side view explaining a state where the upper container 10 is put on the lower container 20 in a correct orientation.
Figure 8B:
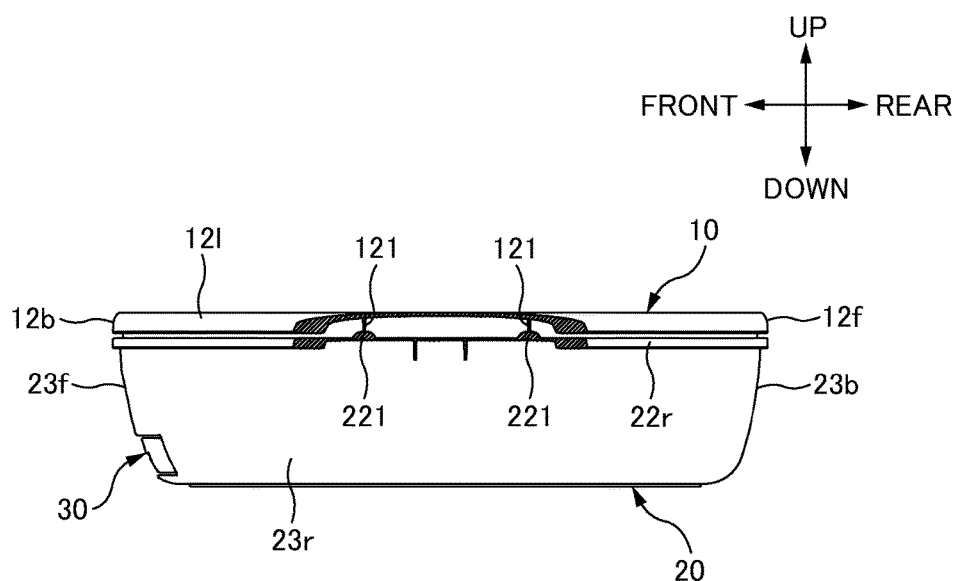
FIG. 8B is a side view explaining a state where the upper container 10 is put on the lower container 20 in a reverse direction in the front-rear direction.

On the contrary, in this embodiment mode the step portion 13 is provided to the front of the upper container 10, thus the configuration is such that the front and the rear of the upper container 10 can easily be determined visually. Further, the animal toilet 1 has a restraining mechanism to restrain the lower container 20 and the upper container 10 from being put on each other in a reverse direction in the front-rear direction. FIG. 8A is a side view explaining the state where the upper container 10 has been put on the lower container 20 in a correct direction. FIG. 8B is a side view explaining the state where the upper container 10 has been put on the lower container 20 in a reverse direction in the front-rear direction. FIG. 8A and FIG. 8B show a state where the hatched regions can be seen through in one part of the edge portion 12 of the upper container 10 and the edge portion 22 of the lower container 20.

In FIG. 8A, in the case where the upper container 10 is correctly put on the lower container 20, namely, in the case where they are put on each other so that the front side of the lower container 20 and the front side of the upper container 10 are aligned as shown in FIG. 2, a pair of claw portions 121 provided to the edge portion 12 (12*r* in FIG. 8A) of the upper container 10 and the pair of protruding portions 221 provided to the edge portion 22 (22*r* in FIG. 8A) of the lower container 20 are in misplaced positions to each other in the front-rear direction. Thus, both containers do not interfere with each other, and the edge portion 12 of the upper container 10 and the edge portion 22 of the lower container 20 are put on each other without being misaligned.

On the other hand, in FIG. 8B, in the case where the upper container 10 is put on the lower container 20 in a reverse direction in the front-rear direction, namely, in the case where both containers are put on each other so that the front side of the lower container 20 and the rear side of the upper container 10 are aligned, the pair of the claw portions 121 provided to the edge portion 12 (12*l* in FIG. 8B) of the upper container 10 and the pair of the protruding portions 221 provided to the edge portion 22 (22r in FIG. 8B) of the lower container 20 are in positions overlapping each other in the front-rear direction. When the upper container 10 is to be put on the lower container 20 in this state, the claw portions 121 and the protruding portions 221 interfere with each other, and the edge portion 12 and the edge portion 22 cannot be put on each other correctly.

In this way, since the claw portions 121 and the protruding portions 221 function as the restraining mechanism, in the case where the assembling direction (placing direction) of the upper container 10 to the lower container 20 is a reverse direction in the front-rear direction, the user can recognize at a glance the mistake of the placing direction. Thus, the upper container 10 is restrained from being put on in the reverse direction in the front-rear direction, and the bottom portion 11 (the urine passing portion 100) of the upper container 10 can be restrained from being arranged to the front side of the animal toilet 1.

It should be noted that the restraining mechanism that restrains the lower container 20 and the upper container 10 from being put on each other in a reverse direction in the front-rear direction is not limited to the example in FIG. 8, and may be modified as below. FIG. 9 is a view explaining a modified example of the restraining mechanism.

Figure 9A:
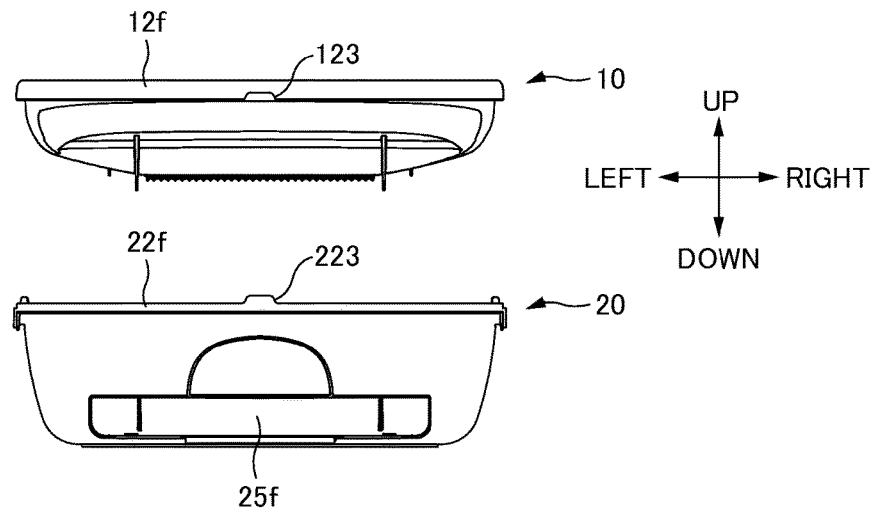
FIG. 9A is a front view explaining a modified example of a restraining 25 mechanism.

FIG. 9A is a front view of viewing an upper container 10 and a lower container 20 in the modified example from a front side in the front-rear direction. The upper container 10 in this modified example is formed with a notch portion 123 (referred to as a to-be-engaged portion) that is notched in a substantially trapezoidal shape near the center in the right-left direction of the front side edge portion 12f. On the other hand, a protruding portion 223 (referred to as an engaging portion) shaped to conform to the notch portion 123 is formed near the center in the right-left direction of the front side edge portion 22f of the lower container 20.

Figure 9B:
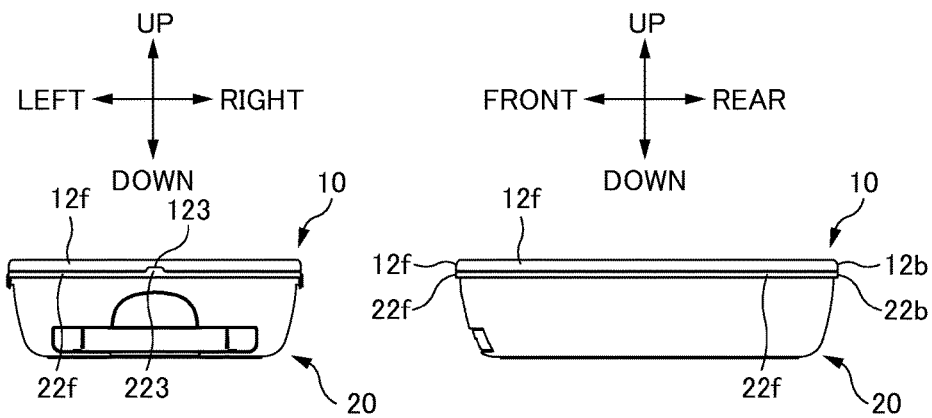
FIG. 9B is a front view and a side view explaining the state where the upper container 10 is put on the lower container 20.

FIG. 9B is a front view and a side view explaining the state where the upper container 10 is put on the lower container 20 in a correct direction in the modified example. In the case of FIG. 9B, namely, in the case where both containers are put on each other so that the front side of the lower container 20 and the rear side of the upper container 10 are aligned, the protruding portion 223 of the lower container 20 and the notch portion 123 of the upper container 10 are engaged, and thus the edge portion 12f of the upper container 10 and the edge portion 22f of the lower container 20 are put on each other without any space in the vertical direction.

Figure 9C:
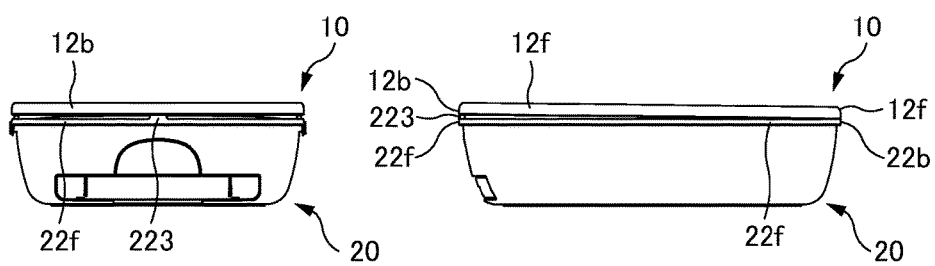
FIG. 9C is front view and aside view explaining the state in which the upper container 10 is put on the lower container 20 in a reverse direction in the front-rear direction in the modified example.

FIG. 9C is a front view and aside view explaining the state in which the upper container 10 is put on the lower container 20 in a reverse direction in the front-rear direction in the modified example. In the case in FIG. 9C, namely, in the case where both containers are put on each other so that the front side of the lower container 20 and the rear side of the upper container 10 are aligned, the protruding portion 223 of the lower container 20 interferes with the edge portion 12b of the upper container 10, so that a space is made between the edge portion 12b of the upper container 10 and the edge portion 22f of the lower container 20, and as shown in FIG. 9C, the front side of the upper container 10 is in a slanted raised state. In this way, the user can recognize that the placing direction of the lower container 20 and the upper container 10 is in a reverse direction.

It should be noted that, the notch portion 123 and the protruding portion 223 that are the restraining mechanism may be both formed to the rear side in the front-rear direction. In the case where the restraining mechanism is formed in at least either one of the front-rear direction, at the time when the upper container 10 is put on the lower container 20 in the reverse direction in the front-rear direction, interference between the end portions in the front-rear direction occurs, and a space is made between the edge portions, so that the containers are not put on each other correctly. In this way, the user can recognize the mistake in the placing direction. Further, the notch portion (the engaging portion) is provided in the edge portion 22 of the lower container 20, and the protruding portion (to-be-engaged portion) that conforms to the notch portion is provided to the edge portion 12 of the upper container 10, and the protruding portion of the upper container 10 and the edge portion of the lower container may interfere with each other.

Figure 10:
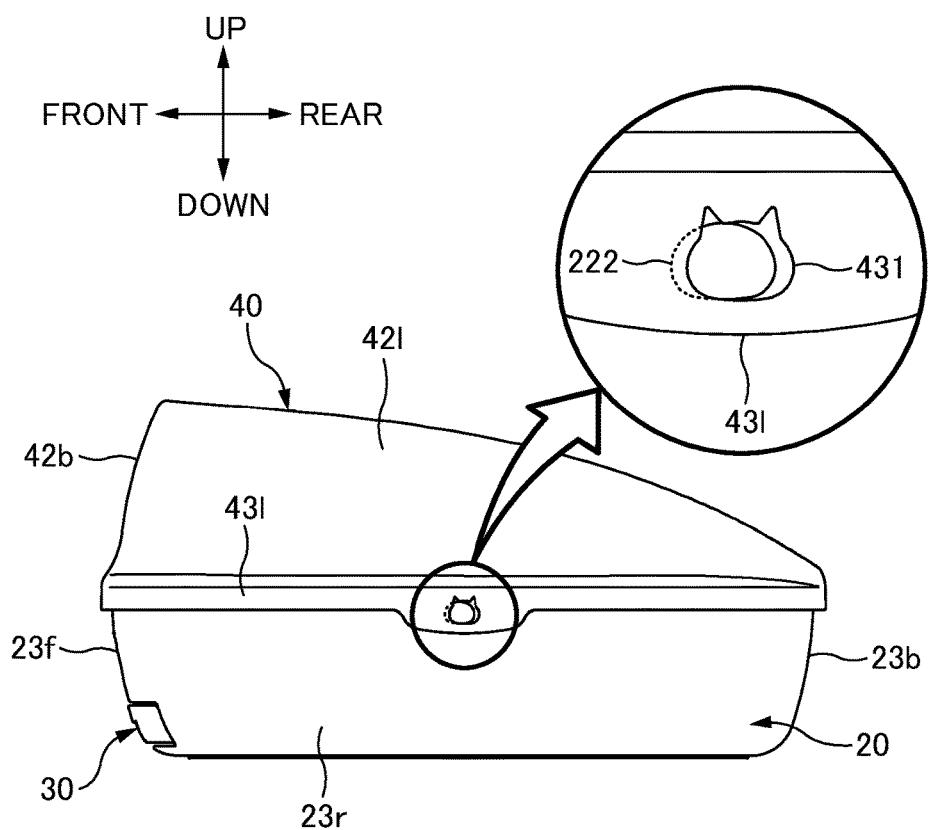
FIG. 10 is a side view showing a state of the animal toilet 1 where a cover 40 has been assembled in a reverse direction in the front-rear direction.

Further, a restraining mechanism to restrain assembling in a reverse direction in the front-rear direction is also provided to the cover 40. FIG. 9 is a side view showing a state where the cover 40 of the animal toilet 1 has been assembled in an opposite direction in the front-rear direction. In the case where the cover 40 has been assembled correctly (namely, in the case where the cover has been assembled so that the entrance/exit opening portion 41 faces the front), the side protruding portions 222 provided to the edge portions 22 of the lower container 20 and the fitting hole portions 431 provided to the edge portions 43 of the cover 40 fit, and the cover 40 is fixed (refer to FIG. 1). On the other hand, in the case where the cover 40 has been assembled in the reverse direction in the front-rear direction, as shown in FIG. 10, the positions in the front-rear direction of the side protruding portions 222 and the fitting hole portions 431 are misaligned and they do not fit each other, and the cover 40 cannot be fixed. With such a restraining mechanism, the cover 40 is restrained from being assembled in a reverse direction in the front-rear direction, and the entrance/exit (the entrance/exit opening portion 41) of the animal toilet 1 is restrained from being arranged to the rear.

It should be noted that, with the animal toilet 1, as shown in FIG. 10, the fitting hole portion 431 is in the shape of a face of an animal, and at the time this fits with the side protruding portion 222, the pattern on the face of the animal can be visually recognized. In this way, the fitting of the fitting hole portion 431 and the side protruding portion 222 can be easily confirmed, and the front-rear direction of the cover 40 can be made so that it is not easily mistaken. The shape of the fitting hole portion 431, however, is not limited to the shape of the face of the animal, and may be other shapes.

Further, with the animal toilet 1 in this embodiment mode, as explained in FIG. 7, the position of the bottom portion 11 (the urine passing portion 100) is misaligned to the rear side in the front-rear direction than the initial setting position of the absorbent body 220. Thus, the urine that has been excreted by the animal mostly drops to the region to the rear side of the absorbent body 220 and is easily absorbed in the region to the rear side. In this case, the region to the rear side of the absorbent body 220 is prone to reach the limit of the liquid absorption capacity before the region to the front side of the absorbent body 220 does, and there is a possibility that the region will not be able to hold the urine and the like. Thus, it is preferable to change the front and the rear of the absorbent body 220 at the point where a certain degree of time has passed after starting use of the absorbent body 220, so as to use the front side region which would have more liquid absorption capacity. In this way, the rear side and the front side of the absorbent body 220 can be used evenly, thus the absorbent body 220 can be made long-lasting and used efficiently, and also since urine and the like can be held in the absorbent body 220 without leaking, the animal toilet 1 can be used hygienically.

As described above, with the animal toilet 1, the tray 30 can be stored in the lower container 20 with the front and the rear in the reverse direction. Thus, by changing the front and the rear direction of the whole tray 30 that is in a state placed with the absorbent body 220, the user can change the front and the rear direction of the absorbent body 220 without directly touching the absorbent body 220.

Other Embodiment Modes

The embodiment mode of this invention has been described above, and the above embodiment mode is to facilitate understating of this invention, and is not to limit understanding of the invention in any way. Further, this invention may be changed and modified without departing from the scope thereof, and it is needless to say that this invention includes its equivalents. For example, the modifications shown below are possible.

In the above described embodiment mode, as shown in FIG. 1, the animal toilet 1 includes the cover 40, but it is not limited to this, and the cover 40 does not have to be included.

In the above described embodiment mode, the excrement treating material 210 that are particulate matters such as cat litter is placed on the bottom portion 11 of the upper container 10, but it is not limited to this in any way.

REFERENCE SIGNS LIST 1 animal toilet
10 upper container
11 bottom portion
12 edge portion
12f front side edge portion 12f
12b rear side edge portion 12b
12r right side edge portion 12r
12l left side edge portion 12l
121 claw portion(s)
123 notch portion (to-be-engaged portion)
13 step portion
13a front step portion
13b rear step portion
14 inclined portion
14b rear side inclined portion
14r right side inclined portion
14l left side inclined portion
20 lower container
21 bottom portion
22 edge portion(s)
22f front side edge portion
22b rear side edge portion
22r right side edge portion
22l left side edge portion
221 protruding portion(s)
222 side protruding portion(s)
223 protruding portion (engaging portion)
23 side wall portion(s)
23f front side wall portion
23b rear side wall portion
23r right side wall portion
23l left side wall portion
25 tray storing portion
25f opening portion
30 tray
31 side wall portion(s)
32 absorbent body placing portion
33 grip portion(s)
40 cover
41 entrance/exit opening portion 41
42 side wall portion(s) 42
42f left side wall portion 42f
42r right side wall portion 42r
42b rear side wall portion 42b
43 edge portion(s) 43
43f front side edge portion 43f
43b rear side edge portion 43b
43r right side edge portion 43r
43l left side edge portion 43l
431 fitting hole portion(s) (hole portions)
100 urine passing portion
101 slit(s) (hole(s))
210 excrement treating material
220 absorbent body
CLa central position (absorbent body)
CLb central position (urine passing portion 100)

The invention claimed is:

1. An animal toilet comprising:
a front-rear direction, a right-left direction, and a height direction;
an upper container that is to be placed with excrement treating material on a bottom portion having a plurality of holes through which urine passes, the bottom portion being a part positioned lowest inside the upper container and having a center in the front-rear direction which center is equal distance from front and rear ends of the bottom portion;
an absorbent body that absorbs urine that passes through the plurality of holes of the upper container, the absorbent body having a center in the front-rear direction which center is equal distance from front and rear ends of the absorbent body;
a tray for holding the absorbent body;
a lower container put below the upper container;
a tray received in the lower container for holding an absorbent body that absorbs urine that passes through the plurality of holes in the upper container, the tray having a front side and a rear side; and
a restraining mechanism that restrains the upper container from being put on the lower container in a reverse direction in the front-rear direction, at the time of putting the upper container on the lower container in the height direction
wherein
the lower container is configured to receive and store the tray by inserting the tray into the lower container in the front-rear direction with either the front side or the rear side of the tray being inserted first,
grip portions are provided on the front side and the rear side of the tray, and
the tray is symmetrically shaped in the front-rear direction,
wherein
the center of the bottom portion of the upper container is arranged nearer to a rear side than the center of the absorbent body in the front-rear direction.

2. An animal toilet according to claim 1, wherein
the restraining mechanism has claw portions provided to both sides in the right-left direction of the upper container, and protruding portions provided to edge portions on both sides in the right-left direction of the lower container, and
in the case where the lower container and the upper container are put on each other so that a front side of the lower container and a rear side of the upper container are aligned, the claw portions and the protruding portions interfere with each other.

3. An animal toilet according to claim 1, wherein
the restraining mechanism has a to-be-engaged portion provided to one of a front side edge portion and a rear side edge portion of the upper container, and an engaging portion provided to an edge portion on a same side as where the to-be-engaged portion is provided of one of the front side edge portion and the rear side edge portion of the lower container, and
in the case where the upper container is put on the lower container so that a front side of the lower container and a rear side of the upper container are aligned, one of interference of the engaging portion with an edge portion of the upper container and interference of the to-be-engaged portion with an edge portion of the lower container occurs.

4. An animal toilet according to claim 1, wherein
the lower container can store the tray by changing a direction of the tray in the front-rear direction.

5. An animal toilet according to claim 1, wherein
a step portion that is a part formed with a level difference in the height direction is provided in between an edge portion to a front side and the bottom portion of the upper container.

6. An animal toilet according to claim 5, wherein
the step portion has
a front step portion and
a rear step portion positioned nearer to a rear side in the front-rear direction than the front step portion, the rear step portion having a greater inclination than the front step portion.

7. An animal toilet according to claim 2, wherein
the lower container can store the tray by changing a direction of the tray in the front-rear direction.

8. An animal toilet according to claim 3, wherein
the lower container can store the tray by changing a direction of the tray in the front-rear direction.

9. An animal toilet according to claim 2, wherein
a step portion that is a part formed with a level difference in the height direction is provided in between an edge portion to a front side and the bottom portion of the upper container.

10. An animal toilet according to claim 3, wherein
a step portion that is a part formed with a level difference in the height direction is provided in between an edge portion to a front side and the bottom portion of the upper container.

11. An animal toilet according to claim 4, wherein
a step portion that is a part formed with a level difference in the height direction is provided in between an edge portion to a front side and the bottom portion of the upper container.

12. An animal toilet according to claim 1, wherein
the tray can be received in and removed from the lower container while the upper container is held by the lower container.

13. An animal toilet comprising:
a front-rear direction, a right-left direction, and a height direction;
an upper container that is to be placed with excrement treating material on a bottom portion having a plurality of holes through which urine passes, the bottom portion being a part positioned lowest inside the upper container and having a center in the front-rear direction which center is equal distance from front and rear ends of the bottom portion;
an absorbent body that absorbs urine that passes through the plurality of holes of the upper container, the absorbent body having a center in the front-rear direction which center is equal distance from front and rear ends of the absorbent body;
a tray for holding the absorbent body;
a lower container put below the upper container;
a tray received in the lower container for holding an absorbent body that absorbs urine that passes through the plurality of holes in the upper container, side protruding portions protruding outward in the right-left direction are provided in edge portions of both sides of the lower container in the right-left direction, the tray having a front side and a rear side, and
a cover that is arranged above the upper container, hole portions that penetrate through in the right-left direction being provided in edge portions of both sides of the cover in the right-left direction, in the case where the cover is arranged so that a front side of the lower container and a rear side of the cover are aligned, the hole portions and the side protruding portions not fitting together
wherein
the lower container is configured to receive and store the tray by inserting the tray into the lower container in the front-rear direction with either the front side or the rear side of the tray being inserted first,
grip portions are provided on the front side and the rear side of the tray, and
the tray is symmetrically shaped in the front-rear direction,
wherein
the center of the bottom portion of the upper container is arranged nearer to a rear side than the center of the absorbent body in the front-rear direction.

14. An animal toilet according to claim 13, wherein
the lower container can store the tray by changing a direction of the tray in the front-rear direction.

15. An animal toilet according to claim 13, wherein
a step portion that is a part formed with a level difference in the height direction is provided in between an edge portion to a front side and the bottom portion of the upper container.

16. An animal toilet according to claim 13, wherein
the tray can be received in and removed from the lower container while the upper container is held by the lower container.

* * * * *